United States Patent Office 3,133,011
Patented May 12, 1964

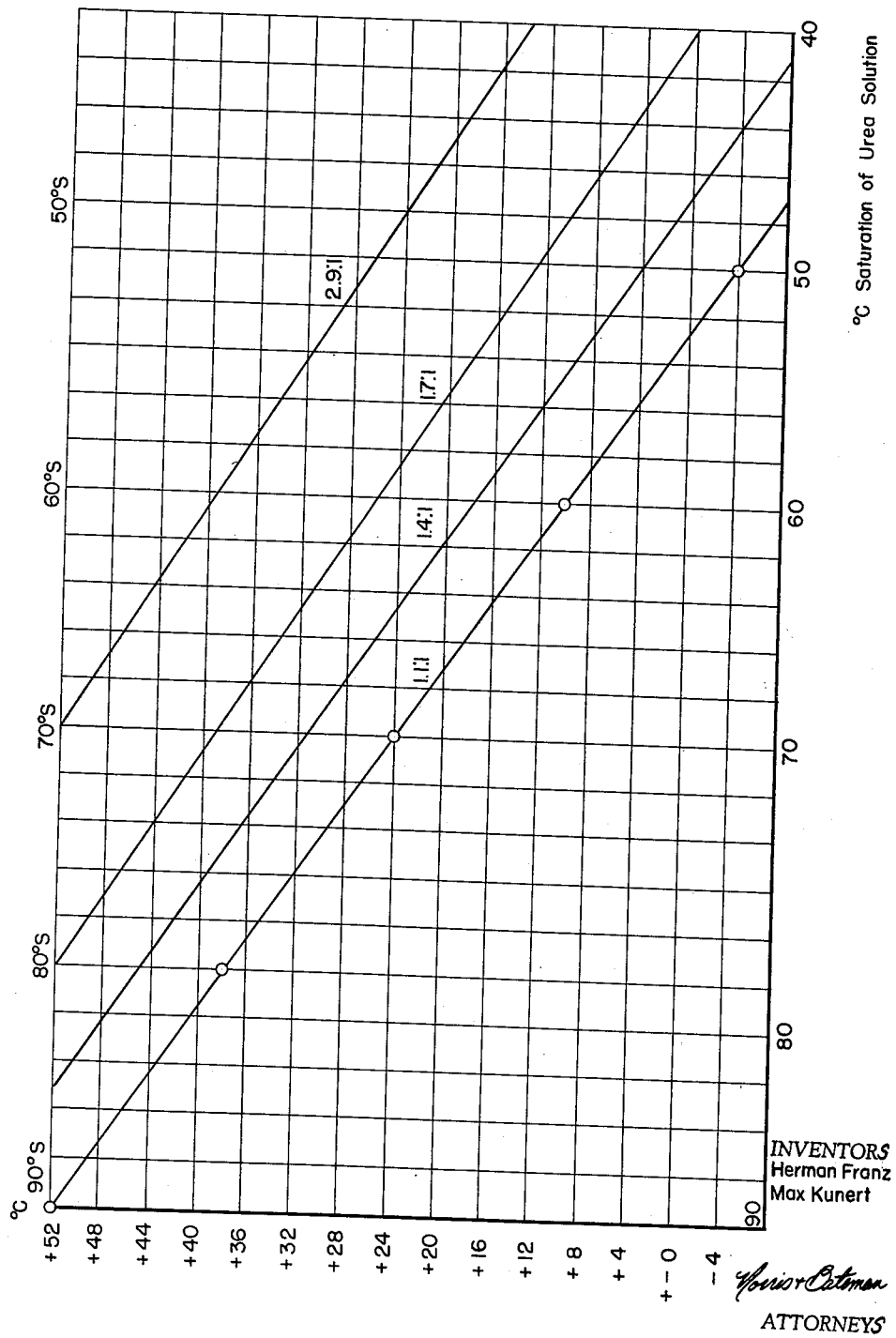

3,133,011
PROCESS FOR THE PRODUCTION OF READILY SEPARABLE ADDUCTS IN THE DEPARAFFINING OF HYDROCARBON OILS WITH UREA
Hermann Franz and Max Kunert, Frankfurt am Main, Germany, assignors to Edeleanu Gesellschaft m.b.H., Frankfurt am Main, Germany, a corporation of Germany
Filed Jan. 19, 1961, Ser. No. 83,733
Claims priority, application Germany Feb. 5, 1960
4 Claims. (Cl. 208—25)

In deparaffing hydrocarbon oils with urea, difficulties occur in separating the adducts formed, which are frequently present as emulsions or fine powders. In order to prepare the adducts in grain form and thus in a form in which they are easily separable, in accordance with a known process certain factors must be taken into consideration, factors such as the nature of the urea solvent, the quantity and concentration of the urea solution added, and the adduct forming temperature.

However, it has become apparent that even when the above-mentioned factors are considered, an adduct ready to be sieved does not always result in a short time but that a long stirring time is often necessary to achieve this grain structure. As is well known, the adduct formation does not take place instantaneously, but longer or shorter periods of time lie between the beginning and end of the adduct formation. In these periods of time the adduct passes through various stages of formation, of which the first stages are characterized by a sticky and greasy condition. The desirable dry, grain form does not occur until the final stage. However, the viscous intermediate stages are very troublesome in a continuous operation because the sticky adduct adheres to the walls of the stirring vessel and to the stirrer and furthermore the desired solidification point is reached only after passing through these intermediate stages, i.e. after a long time.

It is the aim of the invention to exclude the sticky intermediate condition from the adduct-forming process and thereby shorten the stirring time.

It has now been found that the above-mentioned intermediate stages can be avoided or largely suppressed, if a urea solution is used for the adduct formation in which the weight ratio of saturated aqueous urea solution to the urea present as a solid substance does not exceed the value 1.2 to 1. The limit for the ratio lies at about 1.0 to 1.2 parts by weight of urea solution to 1 part by weight of urea. The accompanying drawing shows the foregoing relationship.

For each urea solution of any selected saturation there exists a definite temperature at which the inventive weight ratio between urea solution and solid urea is reached. Thus, this temperature lies at about 38° C. for urea solution of 80° C. saturation, at about 24° C. for those of 70° C. saturation, at about 10° C. for those of 60° C. saturation and reduces to —4° C. for a solution saturated at 50° C.

It is evident from the drawing that these definite temperatures lie on a straight line: in the area above this straight line occur the viscous intermediate stages in the adduct formation, whereas they do not exist below the straight line. It may be seen from the drawing that this definite temperature lies at 52° C. for a urea solution saturated at 90° C. This solution therefore can be used for urea adduct formation at 52° C. without the occurrence of the dreaded viscous intermediate conditions. Thus since the definite temperatures at which the weight ratio of urea solutions to urea lies in the range 1.0 to 1.2:1, for solutions which, for example, are saturated at 80°, 70°, 60° and 50°, are respectively 38°, 24°, 10° and —4°, adduct-forming processes in which the viscous stages are avoided can be carried out only at these temperatures.

The practical importance of eliminating these viscous intermediate stages is apparent from the following examples:

*Example 1*

100 parts by volume of a spindle oil (d.=0.8672, viscosity=20, 64 centistokes) with a content of n-paraffins of 15% by weight are treated at 40° C. with 100 volumetric percent methylene chloride and 120 volumetric percent of a urea solution, saturated at 70° C., and having a weight ratio of urea solution to solid urea of 1.7:1. After a stirring time of 10 minutes the adduct formed was filtered out. The solidification point of the filtrates was —16° C.

*Example 2*

The amount and kind of the spindle oil and oil solvent used were the same as in Example 1. The urea solution saturated at 70° C. had a ratio of urea solution to urea of 1.2:1. 120% by volume of it was added at 24° C. After a stirring time of 7 minutes and after filtering out the adduct the solidification point had lowered to —16° C.

*Example 3*

With the same amount and kind of spindle oil and oil solvent as in Examples 1 and 2, a urea adduct formation was undertaken at 24° C. with 120% by volume of a urea solution saturated at 70° C., whose ratio of urea solution to urea was 1.1 to 1. After 3 minutes stirring time a solidification point of the filtrate of —23° C. was reached.

*Example 4*

The urea adduct formation differs from that in the foregoing examples only in the ratio of urea solution to urea of the urea solution saturated at 70° C. In this case that ratio was 1.0:1. After 3 minutes stirring time a solidification point of the filtrate of —25° C. was obtained.

As the examples clearly show, the inventive range of the ratio of urea solution to urea is of decisive importance for carrying out the adduct formation in a practical manner. Compared to Example 1, the stirring time and the solidification point of the filtrate have been substantially improved in the other examples.

Lowering the ratio of urea solution to urea below a value of 1:1 again leads to viscous intermediate stages, i.e. to an increase in the stirring time and the solidification point of the filtrate.

In continuous operation the following difficulties now and then appeared:

In spite of maintaining the above-mentioned weight ratios, upon long use of the urea solution, the viscous intermediate stages again occur if the urea solution, after long use, contains substances favoring these intermediate stages. In such cases the urea solution is regenerated, e.g. by filtration through active carbon.

The urea solution can be passed over active carbon in the usual manner for regeneration. The regeneration is more efficient if the urea solution resulting from the adduct formation is diluted in water in the ratio 1:1 and subsequently passed through active carbon. Then finally, the regenerated urea solution is concentrated to the desired degree.

In the continuous operation of the urea adduct formation the hot urea solution resulting after the decomposition of the adduct by water or aqueous urea solution is concentrated at 85° C. and is fed back into the mixer in which the adduct formation took place. By using this hot, concentrated urea solution it is now extremely easy to cake the adduct formed.

It appears that these difficulties can be removed when the hot, concentrated urea solution is cooled by adding the oil solvent and this cooled mixture is added to the oil.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A process for producing easily separable adducts in the deparaffining of hydrocarbon oils with urea, characterized by the fact that during the adduct formation the weight ratio of saturated aqueous urea solution to solid urea lies substantially within the limit values of about 1.0:1 to 1.2:1.

2. A process according to claim 1, characterized by the fact that the urea solution resulting in continuous operation after the decomposition of the adduct is diluted with water in the ratio 1:1, then is passed through active carbon and then is again thickened to the desired concentration.

3. In a process for directly producing readily separable solid granular paraffin containing adducts formed when hydrocarbon oils are treated with urea, the step of employing a saturated aqueous urea solution in such treatment for adduct formation wherein the ratio of parts by weight of said urea solution to solid urea lies substantially within the limits of 1.0:1 to 1.2:1.

4. In the process defined in claim 3, said ratio being substantially 1.1 to 1.

References Cited in the file of this patent
UNITED STATES PATENTS

| | | |
|---|---|---|
| 2,642,377 | Fetterly | June 16, 1953 |
| 2,731,455 | Salzmann et al. | Jan. 17, 1956 |
| 2,890,161 | Brown et al. | June 9, 1959 |